United States Patent Office

3,253,036
Patented May 24, 1966

3,253,036
ALKYLATION OF AMINES WITH ALKYL
PHOSPHITES
Raymond B. Crawford, Hamburg, N.Y., assignor to
Allied Chemical Corporation, New York, N.Y., a corporation of New York
No Drawing. Filed Mar. 21, 1962, Ser. No. 181,468
6 Claims. (Cl. 260—577)

The present invention relates to a novel process of alkylating amines. More particularly it relates to a novel process of N-alkylating primary and secondary amines and it is especially concerned with the N-alkylation of aniline and N-alkylanilines.

It has previously been proposed to N-alkylate primary aromatic amines and secondary alicyclic amines using trialkyl phosphates. Because of the oxidizing character of the phosphate esters, alkylation generally is accompanied by oxidation of the amine, thereby producing an excessively colored product which must be distilled or otherwise purified by costly procedures before it can be utilized in most applications.

It is an object of this invention to devise an economical process for preparing N-alkylated amines, particularly N-alkylated anilines, of good quality and color and in high yields.

This and other objects and advantages will be obvious from the following description of my invention.

I have now discovered that a primary or secondary amine may be alkylated by reacting it with an alkyl ester of phosphorous acid. Members of the group consisting of aniline and N-alkylanilines are especially readily and advantageously N-alkylated by the process of the invention.

The reaction of the invention may be conducted by heating a mixture of an amine and an alkyl ester of phosphorous acid to suitable temperatures. The N-alkylated product may be isolated in any convenient manner. When aromatic amines, e.g. aniline and toluidine are alkylated according to the proces of my invention, temperatures ranging from about 100° C. to about 250° C. are preferably employed; however, lower temperatures may be satisfactory when the relatively more reactive aliphatic and alicyclic amines are used. Instead of heating a mixture of these reactants to reaction temperatures, it is often advantageous (as to yield of N-alkylated amine produced) to add the alkyl phosphite gradually to the amine while maintaining the reaction mixture under reflux.

The instant invention affords excellent yields of N-alkylated amines. For example, tertiary amines are produced in yields of about 70 to 100%. Furthermore, the present procedure yields a product which is substantially lighter in color than that obtained by the corresponding N-alkylation reaction employing a trialkyl phosphate.

In the present method all of the alkyl groups of the reagent are available for alkylation. This advantage is not obtained with all N-alkylating reagents, for example in a dialkyl sulfate only one alkyl group is available for N-alkylation of an amine.

Primary and secondary aliphatic, alicyclic and aromatic amines can be readily N-alkylated by the present process. The following examples of suitable amines are indicative of the broad scope of the invention:

Ethylamine                Isopropylamine
p-Toluidine               Aniline
Cyclohexylamine           N-ethylaniline
p-Anisidine               N-methylaniline
o-Chloroaniline           Benzylamine
α-Naphthylamine           p-Phenylenediamine A trialkylester of phosphorous acid containing like lower alkyl groups is preferably employed in the present process. Examples of suitable esters include:

Tripentyl phosphite       Triethyl phosphite
Tripropyl phosphite       Diethyl phosphite
Trimethyl phosphite       Monoethyl phosphite
Triisopropyl phosphite When certain alkyl phosphites, for example trimethyl and diethyl phosphite are employed, the vigorous exothermic reaction which occurs on heating the reaction mass to reflux can be conveniently moderated by cooling the mixture.

At least about $1/n$ mole of alkyl phosphite, where $n$ is the number of alkyl groups in the ester, should be used per mole of amine charged for each nitrogen bonded hydrogen to be replaced in the N-alkylation reaction. Preferably in preparing a tertiary amine about a 20 to 120% excess of the alkylating agent is used and an especially good yield of product is generally obtained when about a 100% excess of the reagent is employed. Use of more than about 140% excess of the ester is wasteful and serves no useful purpose and hence is to be avoided. Obviously when the present process is used to prepare a monoalkylated derivative of a primary amine, the amount of reagent employed should be limited to about minimum operable quantity to avoid excessive alkylation of the substrate.

To obtain satisfactory yields the duration of reflux should preferably be at least about four hours. A reflux period of about ten hours generally affords an especially good yield of N-alkylated product. Refluxing the reaction mass for periods longer than about 15 hours serves no useful purpose and is to be avoided. The refluxing operation can be carried out under increased or diminished pressure if desired.

In the following examples, which serve to illustrate my invention, parts and percentages are by weight unless otherwise noted and temperatures are in degrees centigrade.

EXAMPLE 1

A mixture of aniline (55.8 parts, 0.6 mole) and trimethyl phosphite (59.5 parts, 0.48 mole) was refluxed for 10 hours and cooled. A solution of 50 parts of sodium hydroxide in 200 parts of water was added to the reaction mixture which was then refluxed for one hour. The mixture was cooled to 20°, whereupon an oily and an aqueous layer separated. The aqueous layer was withdrawn and extracted with two 44 part portions of benzene. The benzene extracts were combined with the oil layer which was dried over anhydrous sodium sulfate for two hours. The benzene solution was separated from the drying agent by decantation and evaporated to dryness. The residue, a light brown oil (62.4 parts) was heated for 30 minutes with 26.2 parts of acetic anhydride and cooled. After standing for 16 hours the mixture was dissolved in 88 parts of benzene and this solution was extracted once with a solution of 48 parts of hydrochloric acid (23° Bé.) in 60 parts of water and twice with a solution of 12 parts of hydrochloric acid (23° Bé.) in 20 parts H$_2$O. The combined extracts were made alkaline to a pH of about 9 by addition of 50% aqueous sodium hydroxide. An oily and an aqueous layer separated. The aqueous layer was withdrawn and extracted with 44 parts of benzene. After removal of the benzene by evaporation, the residue was combined with the oil layer to give a yield of 56 parts of N,N-dimethylaniline (77%) identified by its picrate, M.P. 160–163°.

EXAMPLE 2

A mixture of N-methylaniline (32 parts, 0.3 mole) and trimethylphosphite (15 parts, 0.12 mole) was refluxed for 6 hours and cooled. A solution of 25 parts of sodium hydroxide in 100 parts of water was added to the reaction mass which was then refluxed for one hour. The reaction mass was cooled to 20° causing the separation of an oily and an aqueous layer. The aqueous layer was withdrawn and extracted with 44 parts of benzene. The benzene was evaporated from the extract and the residue was combined with the oil layer. The crude product (32.6 parts) was treated with 26 parts of acetic anhydride and further purified as described in Example 1. The product, identified as N,N-dimethylaniline via the picrate as in Example 1, amounted to 30.7 parts, corresponding to a yield of 85% of theory.

EXAMPLE 3

Triethyl phosphite (66.7 parts, 0.4 mole) was added dropwise during 5 hours to refluxing N-ethylaniline (72.6 parts, 0.6 mole) under ordinary pressure. On completion of the addition, the reaction mixture was refluxed for 5 hours and cooled to 50°. Sodium hydroxide (50 parts) in 200 parts of water was added to the reaction mixture, which was refluxed further for one hour. When the reaction mass was cooled to ambient temperature, an oily and an aqueous layer separated. The oil layer was light yellow in color (Barrett Color No. C–1 as evaluated by method 106 described on page 89 in "Barrett Tar Bases," Barrett Div., Allied Chem. and Dye Corp., copyright 1953). A sample (5 parts by volume) of the oil was dissolved in xylene (8.6 parts) and mixed with acetic anhydride (5.4 parts). The heat evolved was measured calorimetrically and used to estimate the amount of N-ethylaniline in the crude product. The absence of N-ethylaniline in the product indicated a substantially 100% yield of N,N-diethylaniline.

For comparison, a mixture of N-ethylaniline (72.6 parts, 0.6 mole) and triethyl phosphate (72.8 parts, 0.4 mole) was refluxed for about 2 hours. The mixture was cooled to about 50° and then refluxed for one hour after addition of 25 parts sodium hydroxide in 100 parts water. The reaction mass was cooled, and allowed to separate into an oily and an aqueous layer. The oil layer thus obtained has a dark brown color (Barrett Color No. C–8) and contained 0.5% N-ethylaniline as determined calorimetrically.

EXAMPLES 4–6

The reaction of N-ethylaniline and triethyl phosphite was repeated in several experiments substantially as described in Example 3 except that the amount of triethylphosphite was varied. The results of these experiments are given in Table I.

Table I

| Example | Amount of Triethyl-phosphite Charged, moles | Estimated Unalkylated N-ethyl-aniline, percent | Color | Yield N,N-diethyl-aniline, percent |
|---|---|---|---|---|
| 4 | 0.22 | 5 | Light yellow | 92 |
| 5 | 0.24 | 0.5 | do | 94 |
| 6 | 0.28 | 0.5 | do | 97 |

EXAMPLE 7

A mixture of aniline (55.8 parts, 0.6 mole) and diethylphosphite (99 parts, 1.2 mole) was heated slowly to 180°. A vigorous reaction occurred at 180–185°. The reaction mixture was maintained at 180–190° for 10 minutes with cooling. The reaction mixture was refluxed at 190–195° for 10 hours and cooled. A solution of 85 parts sodium hydroxide in 300 parts of water was added to the reaction mass and the resulting mixture was agitated for 10 minutes at ambient temperature. The oily layer which separated was withdrawn and dried over anhydrous sodium sulfate for 16 hours. The crude product (84.5 parts) contained 2.1% N-ethylaniline determined as described in Example 3. The yield of light orange-yellow N,N-diethylaniline was 92.5%.

It can thus be seen that an effective process has been devised to N-alkylate primary amines such as aniline and secondary amines such as N-alkylaniline employing an alkyl phosphite as the alkylating reagent.

The foregoing examples illustrate my invention, but it is not to be limited to the specific details of the above illustrations.

For example, the isolation of the alkylated product can be accomplished by several suitable methods as will be obvious to those skilled in the art. Conveniently, the isolation step can include a treatment of the crude product with aqueous caustic to neutralize phosphorous acid and hydrolyze unreacted phosphite ester. Also, it is usually desirable in preparing tertiary amines to treat the crude product with acetic anhydride to acylate unalkylated amine and thus facilitate its removal.

The present invention has several advantages over known procedures as will be obvious to those skilled in the art. Firstly, my invention affords high yields of N-alkylated amines. Secondly, the N-alkylated amine products obtained by the present invention are only slightly colored and can be employed in many applications without the need for distillation or other expensive purification treatments. Further, costly excesses of reagent are not required by the present process since all of the alkyl groups of the reagent are available for reaction.

I claim:
1. A process for N-alkylating primary and secondary amines which comprises heating an amine having the formula

in which R$_1$ is selected from the group consisting of aralkyl, lower alkyl, cycloalkyl and substituted and unsubstituted aryl radicals, R$_2$ is selected from the group consisting of hydrogen and lower alkyl, and the substituents on the aryl radical are selected from the group consisting of mono-lower alkyl, mono-lower alkoxy, monochloro and monoamino, in the presence of lower alkyl ester of phosphorous acid.

2. The process of claim 1 wherein the amount of phosphorous acid ester is at least stoichiometrically equivalent to the amount of amine.

3. The process of claim 1 wherein the amine and the phosphorous acid ester are heated to temperatures in the range 100° to about 250° C.

4. The process of claim 1 wherein the alkyl ester of phosphorous acid is added gradually to the amine while the reaction mixture is maintained under reflux conditions.

5. The process of claim 1 wherein the alkyl ester of phosphorous acid is selected from the group consisting of tripentyl phosphite, tripropyl phosphite, trimethyl phosphite, triisopropyl phosphite, triethyl phosphite, diethyl phosphite and monoethyl phosphite.

6. A process for N-alkylating amines which comprises heating under reflux an amine selected from the group consisting of aniline and N-lower alkyl aniline while gradually adding at least a stoichiometric amount of an alkyl ester of phosphorous acid selected from the group consisting of tripentyl phosphite, tripropyl phosphite, trimethyl phosphite, triisopropyl phosphite, triethyl phosphite, diethyl phosphite, and monoethyl phosphite.

References Cited by the Examiner
UNITED STATES PATENTS
2,064,797   12/1936   Holsten _____ 260—576 X

OTHER REFERENCES

Arbuzov et al.: "Chemical Abstracts," vol. 54, pp. 1498-9 (1960).

CHARLES B. PARKER, *Primary Examiner.*

ROBERT V. HINES, *Assistant Examiner.*